United States Patent
Para

(10) Patent No.: US 11,827,458 B2
(45) Date of Patent: Nov. 28, 2023

(54) ROTARY TABLE BOX MANIPULATOR

(71) Applicant: PARA S.R.L., San Mauro a Signa-Firenze (IT)

(72) Inventor: Emanuele Para, Quarrata-Pistoia (IT)

(73) Assignee: PARA S.R.L., Florence (IT)

( * ) Notice: Subject to any disclaimer, the term of this patent is extended or adjusted under 35 U.S.C. 154(b) by 0 days.

(21) Appl. No.: 17/273,130

(22) PCT Filed: Apr. 8, 2019

(86) PCT No.: PCT/IT2019/000030
§ 371 (c)(1),
(2) Date: Mar. 3, 2021

(87) PCT Pub. No.: WO2020/208660
PCT Pub. Date: Oct. 15, 2020

(65) Prior Publication Data
US 2022/0219907 A1   Jul. 14, 2022

(51) Int. Cl.
*B65G 37/02* (2006.01)
*B65G 47/80* (2006.01)
*B65G 57/00* (2006.01)

(52) U.S. Cl.
CPC ............. *B65G 37/02* (2013.01); *B65G 47/80* (2013.01); *B65G 57/00* (2013.01); *B65G 2203/0225* (2013.01)

(58) Field of Classification Search
None
See application file for complete search history.

(56) References Cited

U.S. PATENT DOCUMENTS 6,073,747 A * 6/2000 Takino ................... B65G 13/10
198/370.09
8,978,879 B2 * 3/2015 Fourney ............... B65G 47/244
198/782

(Continued)

FOREIGN PATENT DOCUMENTS

DE          10217113 A1   10/2003
DE      102010015584 A1   10/2011

(Continued)

OTHER PUBLICATIONS

Para srl: "Para Movie R&D Department", Youtube, Jul. 4, 2013 (Jul. 4, 2013), p. 1 pp., XP054978694, Retrieved from the Internet: URL:https://www.youtube.com/watch?v=w0RSPIF4UHU&feature=youtu.be [retrieved on Sep. 17, 2018].

*Primary Examiner* — Kavel Singh
(74) *Attorney, Agent, or Firm* — McGlew and Tuttle, P.C.

(57) ABSTRACT

A rotary table box manipulator, comprising: a horizontal supporting plane (1); a first rotary table (2) inscribed in and coplanar with said horizontal plane; a conveyor belt (3) arranged in a loop and movable along a longitudinal advancement direction above the supporting plane (1) and the table (2), equipped with a distribution of rotating balls (4) whose lower part is in contact with the upper surface of the plane (1) and of the table (2), so as to define an upper movable surface for supporting and transporting one or more boxes or packages of boxes (5), further comprising at least one second rotary table (6) inscribed in and coplanar with said first rotating table (2) and able to move independently from it.

6 Claims, 5 Drawing Sheets

(56) References Cited

U.S. PATENT DOCUMENTS

| | | | |
|---|---|---|---|
| 9,365,364 B1 * | 6/2016 | Morgan | B65G 67/22 |
| 10,773,894 B2 * | 9/2020 | Meschenmoser | B65G 35/06 |
| 2015/0083550 A1 | 3/2015 | Wilson et al. | |

FOREIGN PATENT DOCUMENTS

| | | |
|---|---|---|
| EP | 0503365 A1 | 9/1992 |
| EP | 1980507 A1 | 10/2008 |
| WO | 2014012861 A1 | 1/2014 |

* cited by examiner

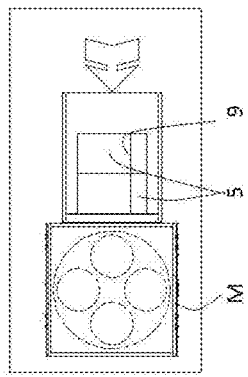
FIG. 2a
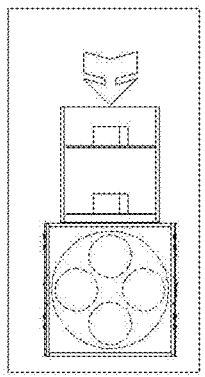
Fig. 2b
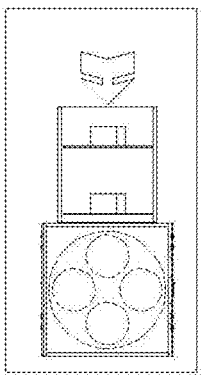
FIG. 2c
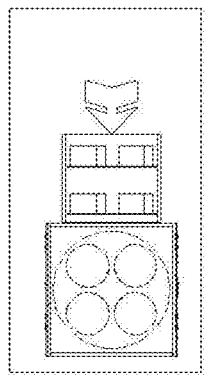
FIG. 2d
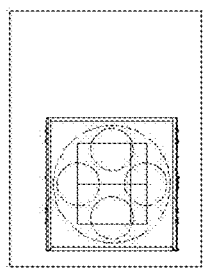
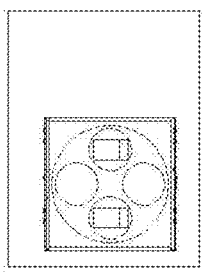
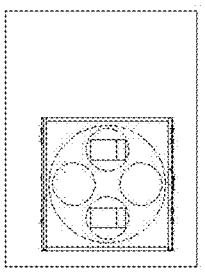
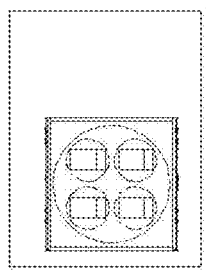
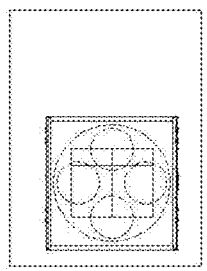
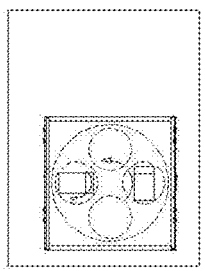
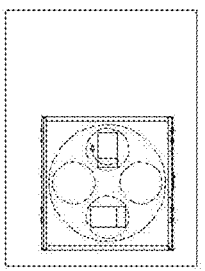
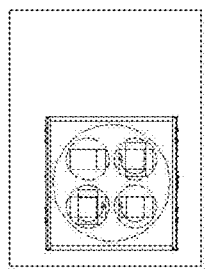
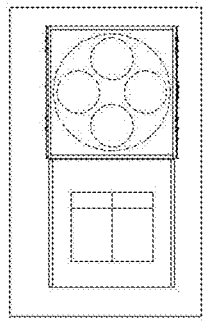
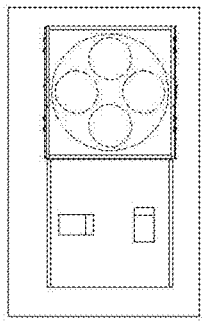
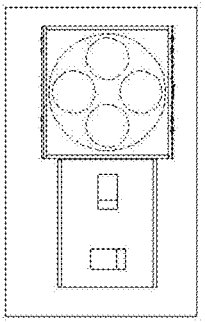
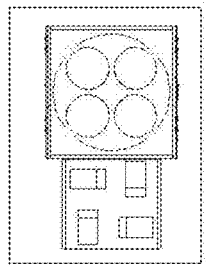

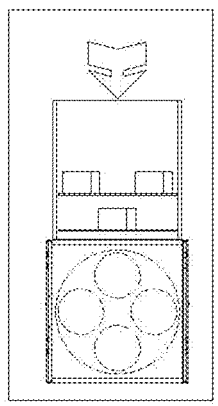
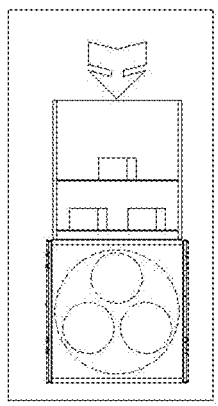
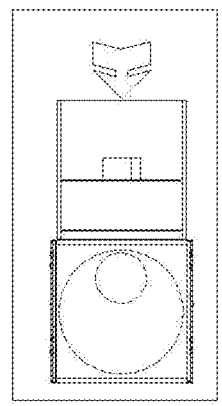
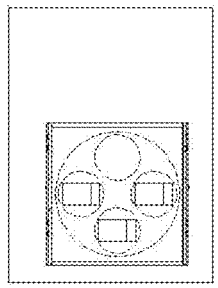
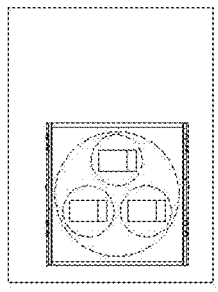
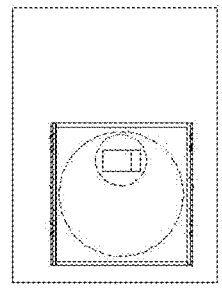
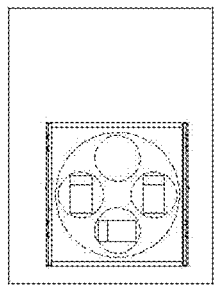
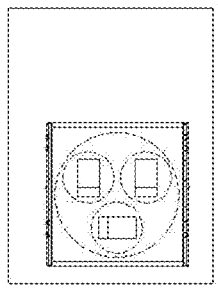
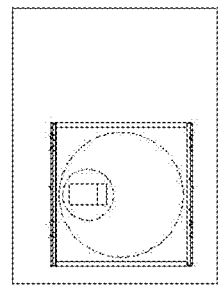
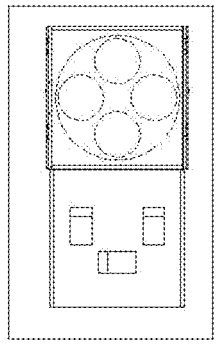
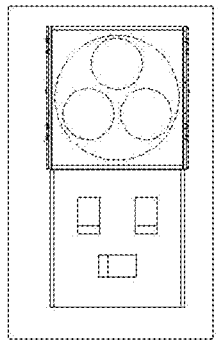
FIG. 2e  FIG. 2f  FIG. 2g

ROTARY TABLE BOX MANIPULATOR

TECHNICAL FIELD

The present invention relates to a rotary table manipulator apparatus of the type known as "pack turners", intended to receive a sequence of boxes to be palletized or for other use, and arrange them in the optimal configuration for stacking or other use, depending on the type and size of the boxes and of the receiving pallet.

BACKGROUND ART

Currently, apparatuses for turning packs formed by a rotary table surmounted by a ball-type conveyor, comprised of a belt arranged in a loop which encloses a uniform arrangement of idle rotating balls whose lower part is in contact with the surface of a rotary table and of a supporting plane placed as a frame of the table, are known.

In operation, the boxes to be handled are fed onto the belt, which can be moved in an advancement direction. In this step, due to the contact with the lower surface, the balls rotate at twice the speed of the belt, and advance the boxes above the supporting plane.

Once a box has reached the rotary table, the feed can be stopped, and the table rotated. Also due to the lower contact, the balls will rotate in the opposite direction, rotating, in turn, the box up to the desired position. The subsequent movement of the belt will advance the box oriented as desired further until it leaves the manipulator.

However, the known technical solutions have some drawbacks due to the relative rigidity and low productivity in the handling of the incoming boxes.

Therefore, a need is felt to have a rotary table manipulator capable of handling different configurations and shapes of incoming boxes with an improved productivity, depending on the desired position of the boxes and the pallet on which the boxes are to be stacked, also with the possibility to rotate the boxes or bundles or other independently from each other.

OBJECT OF THE INVENTION

Through the present invention, the aim is to overcome the drawbacks of the already known solutions and propose a highly productive manipulator device, which can be modulated according to the arrival rate of boxes or bundles.

A further object is to propose a manipulator device with high flexibility in the configurations of the outgoing boxes with the possibility to rotate the boxes or bundles or other independently from each other.

SUMMARY OF THE INVENTION

These objects have been achieved by producing a pack turning manipulator according to at least one of the appended claims.

The proposed solution has many advantages:

A first advantage is that the manipulator can take over and handle a different number of boxes or bundles, based on the arrival rate of the upstream boxes and their size.

A further advantage is that the manipulator allows to orient the received boxes or bundles one with respect to another, based on the desired final configuration and the conformation of the boxes, for example either of the closed type with double welding edge or open and with uniform thickness.

LIST OF DRAWINGS

These and other advantages will be better understood by anyone skilled in the art from the description below and the accompanying drawings, given as a non-limiting example, wherein:

FIGS. 2a-2g show different possible configurations of boxes when arriving at the line of FIG. 1 and their final configuration when leaving the line;

DETAILED DESCRIPTION

Figure 1:
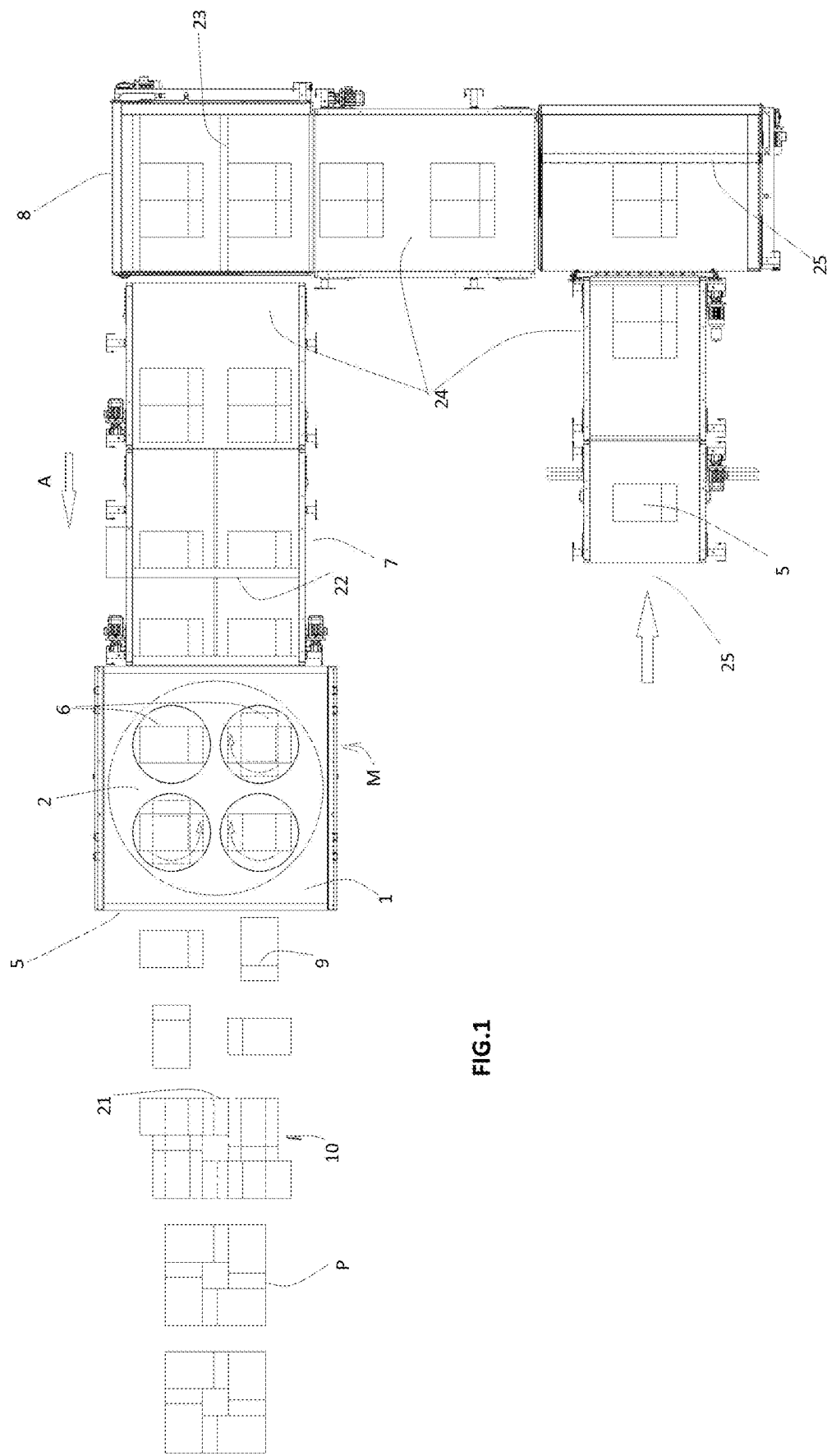
FIG. 1 shows a schematic plan view of a handling line for boxes equipped with the manipulator of the invention.
Figure 3:
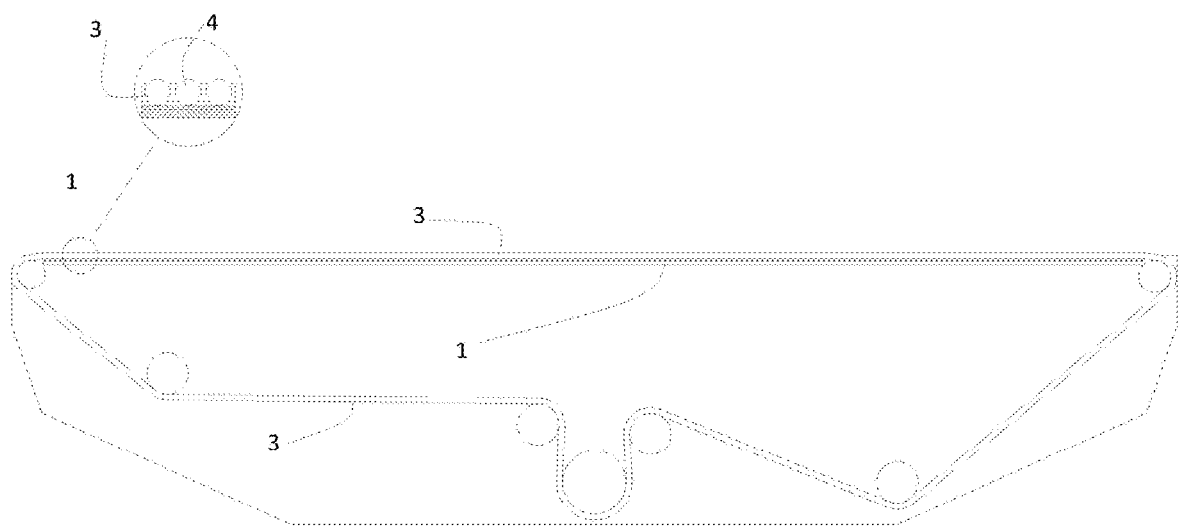
FIG. 3 shows a schematic side view of a conveyor belt used in a manipulator according to the invention.
Figure 4:
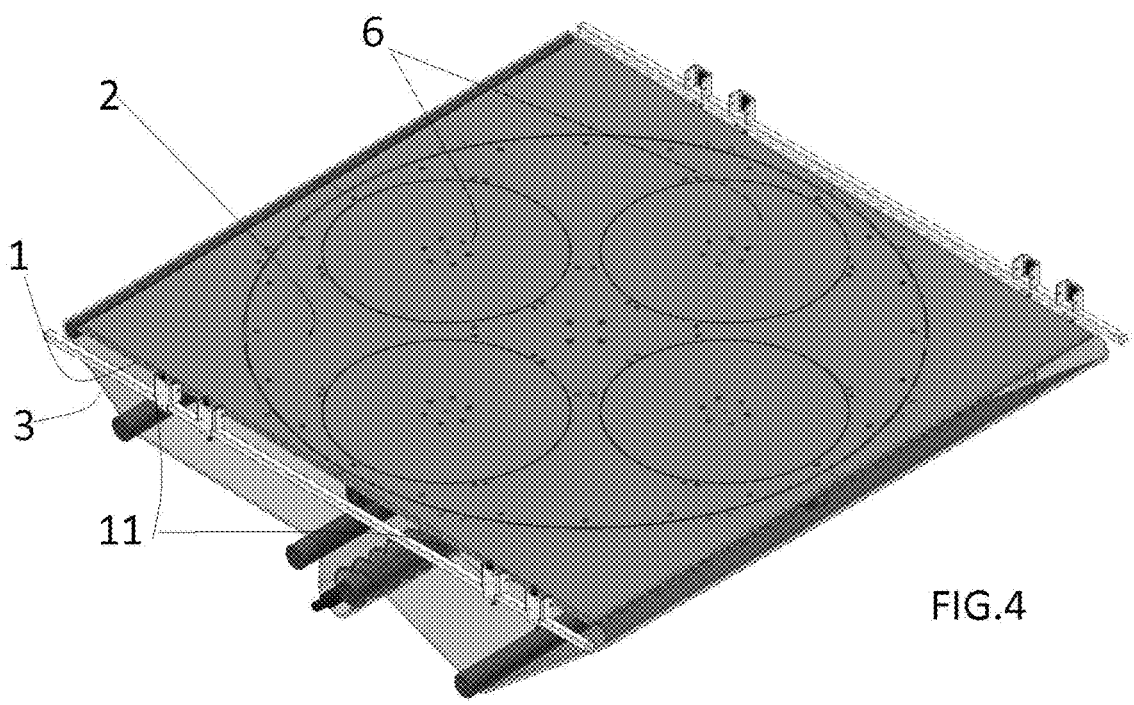
FIG. 4 shows a top view of a manipulator according to the invention.
Figure 5:
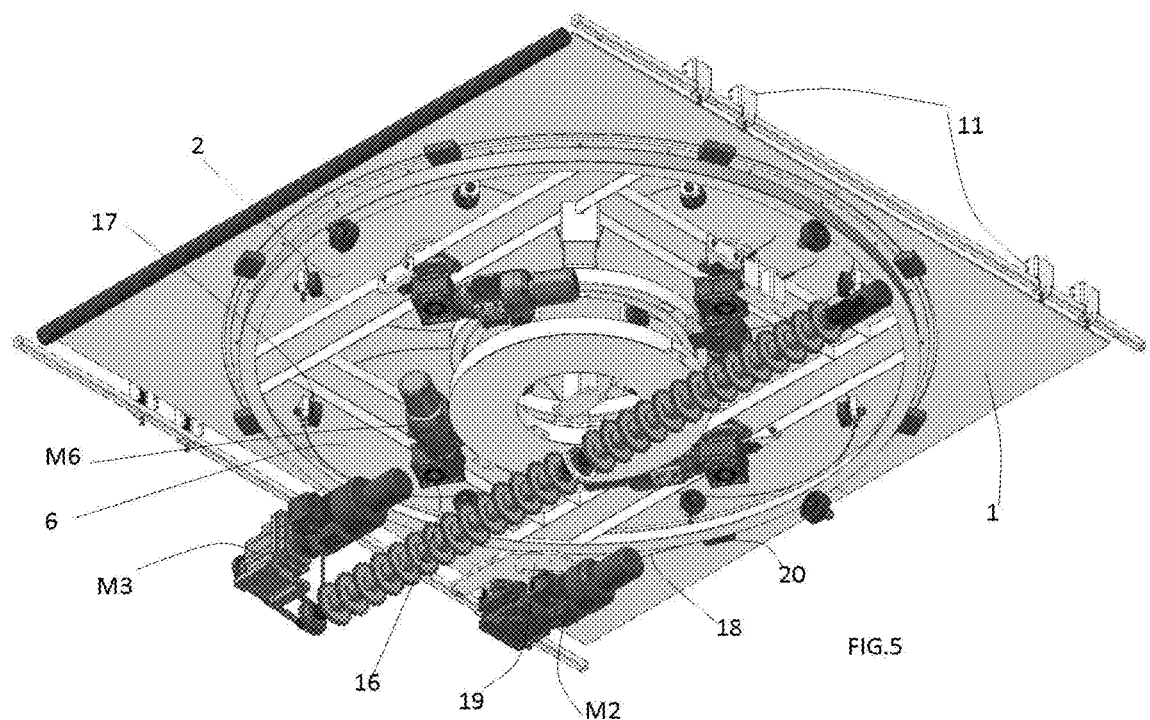
FIG. 5 shows a bottom view of a manipulator according to the invention with the engines shown.
Figure 6:
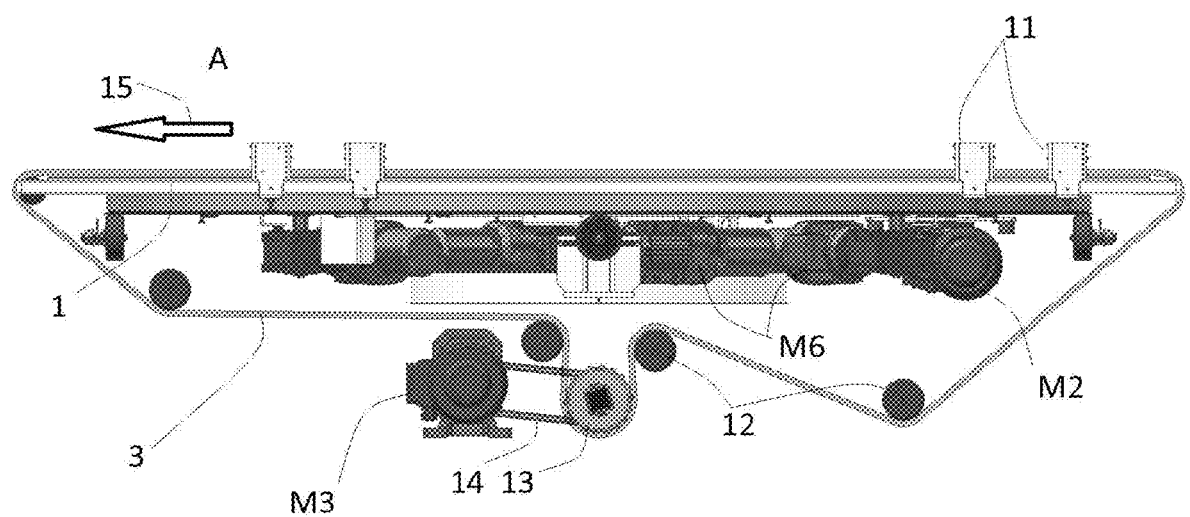
FIG. 6 shows a side view of the manipulator in FIG. 5.

With reference to the accompanying drawings, a rotary table manipulator M for boxes or packages of stacked boxes 5 is described.

In the described embodiment, the manipulator comprises a horizontal supporting plane 1 equipped with one or more alignment sensors 11, in which a first rotary table 2 is inscribed and is coplanar, being moved by an independent engine M2, for example comprised of a motor which operates a pulley 19 engaged with a transmission belt 18 engaged, in turn, with a peripheral edge 20 of the table 2.

Above the plane 1 and the table 2, a conveyor belt 3 can slide, arranged in a closed loop, preferably around return rollers 12 and movable in a longitudinal advancement direction thanks to a drive shaft 13 driven by an independent engine M3.

The belt 3, of the type per se known, is equipped with a distribution of balls 4 caged in the structure of the belt and rotating with their lower part in contact with the upper surface of the plane 1 and of the table 2, so as to define an upper movable surface 15 for supporting and transporting one or more boxes or packages of boxes 5.

As a result of this arrangement, a movement in the advancement direction A of the belt involves a rotation of the balls 4 and a double transport speed in the direction A generated by the displacement of the transport surface 15 defined by the upper bearing points of the balls 4.

According to the invention, the manipulator comprises at least one second rotary table 6, inscribed in and coplanar with said first rotary box 2 and movable independently from it, by means of an independent engine M6 comprised of, for example, a motor which drives a rotating shaft 16 and wheels 17 for supporting the table 6.

Preferably, the manipulator comprises four second tables 6 arranged symmetrically along two directions, a parallel one and an orthogonal one, to the advancement direction A, decentralised with respect to the centre of rotation of the first rotary table 2.

The manipulator M described above is preferably inserted in a handling line for boxes further comprising a first separating device 7 placed upstream of the manipulator for supplying the manipulator with a sequence of boxes or bundles 5 evenly spaced along the advancement direction, for example by means of an abutment and retention member 22, at a distance equal to the longitudinal distance of the tables 6, so as to make the line of advancement of the boxes coincide with the position of the rotary tables.

In the described instance, the line is arranged with a U-shaped development of the transport plane 24 from a feeding unit 25 to the manipulator M and comprises a second separating device 8 for supplying the manipulator with a sequence of boxes 5 spaced also along the transverse direction orthogonal to the advancement direction, for example by means of an abutment and retention member 23, at a distance equal to the transverse distance of the tables 6.

In the event the boxes 5 are closed boxes with double stitching edge 9, it is known that stacking them on the receiving pallet causes an instability of the stack formed on the pallet due to the greater local thickness of the double edge. To overcome this drawback, the line may comprise a lifting device 10, of the type per se known, placed downstream of the manipulator M to stack in vertical piles layers of boxes or packages of boxes 5 which are oriented differently, in order to compensate for the greater thickness of the double edge in the stack of boxes.

Finally, the line may comprise an aligner device 21, possibly at the lift 10, to align the boxes or packages of boxes stacked on the receiving pallet P.

In operation, with reference to the particular embodiment illustrated in the drawings, to be understood in an explanatory and non-limiting way, the boxes 5, individually or in packages or bundles, are fed by the feeding unit 25 onto the transport plane 24, for example consisting of one or more conveyors.

During the transfer onto the plane 24, the boxes 5 are aligned by means of an abutment 26 arranged at the end of a first longitudinal section of the plane 2 and then sent sequentially to the separator 8, arranged at the end of the transverse section of the U, which provides to space the boxes or bundles along the transverse direction, at a distance equal to the distance between the rotary tables 6 arranged orthogonally to the advancement direction A.

In the second longitudinal section of the plane 24, the boxes are advanced up to the separator 7, which provides to space the boxes or bundles along a longitudinal direction at a distance equal to the distance between the corresponding rotary tables 6 along the advancement direction A.

From the separator 7, the boxes transfer onto the belt 3 of the manipulator M until they reach the rotary tables 6.

In this position, the manipulator may, as appropriate, rotate the main rotary table 2 or one or more of the inner tables 6, in order to orient the boxes in the desired configuration to set up the stack on the receiving pallet P.

The outgoing boxes from the manipulator can then be aligned and lifted by means of alignment devices 21 and lifting devices 10, to form the stack P.

FIGS. 2a-2d show, by way of example, four possible movements, distinguished in subsequent steps f1-f4.

FIG. 2a
step f1 four boxes or bundles oriented in the same way, one for each inner rotary table 6, are fed onto the moving belt 3;
step 2 the boxes are on the rotary tables and the belt 3 stops;
step 3 a box (in the upper right in the figure) is left still, the others, viewed clockwise, are rotated by 90°, 180°, 270°, respectively;
step 4 the belt 3 has expelled the boxes oriented by the manipulator.

FIG. 2b
step f1 two boxes or bundles oriented in the same way, spaced along the longitudinal direction, are fed onto the moving belt 3;
step 2 the boxes are on the rotary tables 6 and the belt 3 stops;
step 3 a box (on the left in the figure) is left still, the other is rotated by the corresponding table 6 by 90°;
step 4 the belt 3 has expelled the boxes oriented by the manipulator.

FIG. 2c
step f1 two boxes or bundles oriented in the same way, spaced along the longitudinal direction, are fed onto the moving belt 3, as in the previous instance;
step 2 the boxes are on the rotary tables and the belt 3 stops;
step 3 the main table 2 rotates by 90° counter-clockwise, a box (on the bottom in the figure) is left still, the other is rotated by the corresponding table 6 by 180°;
step 4 the belt 3 has expelled the boxes oriented by the manipulator.

FIG. 2d
step f1 two boxes or bundles oriented in the same way, placed side by side and having size exceeding the single inner tables 6, are fed onto the moving belt 3;
step 2 the boxes are on the main rotary table and the belt 3 stops;
step 3 the main table 2 rotates by 90°;
step 4 the belt 3 has expelled the boxes oriented by the manipulator.

FIG. 2e
step f1 three boxes or bundles oriented in the same way, spaced so as to correspond to three inner rotary tables 6, are fed onto the moving belt 3;
step 2 the boxes are on the three corresponding rotary tables and the belt 3 stops;
step 3 the most advanced box (on the left in the figure) is rotated by 180°, the others are rotated by 90° clockwise;
step 4 the belt 3 has expelled the boxes oriented by the manipulator.

FIG. 2f
In this example, the manipulator is equipped with three inner rotary tables 6.
step f1 three boxes or bundles oriented in the same way, spaced so as to correspond to the three inner rotary tables as in the previous instance, are fed onto the moving belt 3;
step 2 the boxes are on the rotary tables and the belt 3 stops;
step 3 the main table rotates by 180°, the most advanced box (on the left in the figure) is left still, the others are rotated by 90° counter-clockwise;
step 4 the belt 3 has expelled the boxes oriented by the manipulator.

FIG. 2g
In this example, the manipulator is equipped with an inner rotary table 6 decentralised with respect to the centre of rotation of the main table.
step f1 a box or bundle arranged so as to correspond to the inner rotary table is fed onto the moving belt 3;
step 2 the box is on the rotary table and the belt 3 stops;
step 3 the main table rotates by 90° counter-clockwise and the box is rotated by the internal table by 90° clockwise;
step 4 belt 3 has expelled the box oriented by the manipulator.

The given examples are only indicative, the manipulator of the invention in fact allows to handle independently a number of boxes or bundles or other elements corresponding to the inner rotary tables.

This feature, in combination with the independent movement of the main table 2 and of the motion of the belt 3, allows to increase the productivity of the manipulator based on the arrival rate of the boxes upstream of the line, while allowing a high flexibility in the resulting final configuration.

The present invention has been described according to preferred embodiments, but equivalent variants can be designed without departing from the agreed scope of protection.

The invention claimed is:

1. A rotary table box manipulator, comprising:
  a horizontal supporting plane;
  a first rotary table coplanar with the horizontal plane;
  an endless conveyor belt, the conveyor belt being configured to move along a longitudinal advancement direction, wherein a portion of the conveyor belt extends over the horizontal supporting plane, wherein the portion of the conveyor belt is located at a position located above the horizontal supporting plane and the first rotary table, the conveyor belt comprising rotating balls, each of the rotating balls comprising a lower portion configured to contact an upper surface of the horizontal supporting plane and to contact an upper surface of the first rotary table to define an upper movable surface for supporting and transporting one or more of boxes, packages of boxes and bundles; and
  a second rotary table coplanar with said first rotary table, each of said first rotary table and said second rotary table being configured to be moved independent of each other.

2. A manipulator according to claim 1, further comprising:
  a third rotary table coplanar with said first rotary table, each of said first rotary table, said second rotary table and said third rotary table being configured to be moved independent of each other;
  a first independent motor configured to move said first rotary table;
  a second independent motor configured to move said conveyor belt;
  a third independent motor configured to move said second rotary table; and
  a fourth independent motor configured to move said third rotary table.

3. A manipulator according to claim 2, wherein said second rotary table and said third rotary table are arranged at a spaced location from a center of rotation of said first rotary table.

4. A manipulator according to claim 2, further comprising another rotary table concentric with said first rotary table.

5. A manipulator according to claim 2, further comprising a fourth rotary table to provide four rotary tables, said four rotary tables being arranged along a first direction and a second direction, the first direction being parallel to said advancement direction, the second direction being orthogonal with respect to said advancement direction, symmetrically away from a center of rotation of said first rotary table.

6. A manipulator according to claim 2, further comprising one or more alignment sensors on an edge of said horizontal supporting plane.

* * * * *